United States Patent
Lhotak et al.

[11] Patent Number: 5,819,026
[45] Date of Patent: Oct. 6, 1998

[54] SYSTEM AND METHOD FOR ARBITRATING ACCELERATOR REQUESTS

[75] Inventors: Vladimir Lhotak, Santa Clara; Riaz A. Moledina, Woodside, both of Calif.

[73] Assignee: Apple Computer, Inc, Cupertino, Calif.

[21] Appl. No.: 473,279

[22] Filed: Jun. 6, 1995

[51] Int. Cl.⁶ .............................. G06F 9/30; G06F 9/345
[52] U.S. Cl. .............................. 395/183.14; 395/183.21; 395/595
[58] Field of Search ..................... 395/439, 800, 395/442, 500, 491, 830, 702, 183.21, 800.34, 384, 704, 587, 595; 341/107, 58, 67; 375/240; 364/DIG. 2, DIG. 1, 728.01; 358/518, 519; 379/96, 95; 371/21; 380/4

[56] References Cited

U.S. PATENT DOCUMENTS

| | | | |
|---|---|---|---|
| 5,394,534 | 2/1995 | Kulakowski et al. | 395/439 |
| 5,475,388 | 12/1995 | Gormish et al. | 341/107 |
| 5,561,688 | 10/1996 | Jones, Jr. | 375/240 |
| 5,572,340 | 11/1996 | Eckhardt et al. | 358/518 |

*Primary Examiner*—Daniel H. Pan
*Attorney, Agent, or Firm*—Burns, Doane, Swecker & Mathis, LLP

[57] ABSTRACT

The present invention is a method and system for reducing delays due to a stream of digital data processing requests to a function specific hardware circuit. The system includes a first hardware stage implemented to perform the given function and a second parallel software code stage implemented to perform the same function. The hardware stage employs circuitry to implement the function whereas the software stage performs the function using software code including function specific processor instructions. The system also includes an arbitration stage that routes the data values to either of the hardware or software stages depending on the availability of the hardware stage and in accordance to pre-defined arbitration rules.

6 Claims, 2 Drawing Sheets

SYSTEM AND METHOD FOR ARBITRATING ACCELERATOR REQUESTS

FIELD OF THE INVENTION

The present invention relates to system designs and particularly to systems including hardware acceleration circuits.

BACKGROUND OF THE INVENTION

Currently, when a given complex logical or mathematical function is performed on digital data, a system designer has the choice between performing the function with software code or with a hardware circuit.

When the function is implemented with software, the designer uses code (i.e. processor instructions) to instruct a processor to perform simple mathematical operations (e.g. addition and subtraction), logical operations (e.g. AND and OR operations), or data transfer operations (e.g. loads and stores) in order to carry out the complex function on the digital data to obtain the desired digital result. The speed at which the function is performed is dependent on how fast the processor can run the software code that, in turn, is dependent on processor-related characteristics such as the processor instruction rate, the number of other devices requesting processor time, etc.

Implementing the function with hardware involves designing a circuit with electrical components (typically integrated switching components) that perform the function on the digital input data and outputs the desired digital output data. The delay associated with the hardware implementation is dependent on the overall delay of the circuit that, in turn, is determined by the speed of the electrical components in the circuit. Because processor instructions are performed at a much slower rate than the rate at which data is processed through a special purpose electrical circuit, the hardware implementation of a function is almost always faster than a corresponding software implementation. Thus, the trend in system design is to implement function specific hardware to augment overall system speed.

In a system that performs a function, if the system is not already busy processing a data value or a block of data values, it accepts new data and begins processing it. If a subsequent request to process data is received while the system is still busy processing a current request, the subsequent request is queued until the system is done processing the current one. In this type of system, a bottleneck of processing requests may occur resulting in significant system delays and/or processor down times.

One technique employed to minimize delays resulting from queued processing requests employs parallel processing. Parallel processing is normally implemented with two parallel software processing paths that simultaneously process data requests. Consequently, delays resulting from the queued requests can be minimized. However, the main drawback with this type of implementation is that the minimum non-delayed speed of the software parallel processing path implementation is still slower than the minimum non-delayed processing speed of a hardware implementation.

Parallel processing using two parallel hardware processing paths may be implemented to minimize queued request problems. However, a hardware parallel processing implementation can be a space consuming and expensive practice. Consequently, when a system is designed with function specific hardware, designers often accept the penalty of the delays resulting from queued requests in view of the speed gained by the hardware implementation. Thus, what is needed is a method for minimizing queuing delays in a system associated with a function specific hardware.

SUMMARY OF THE INVENTION

The present invention is a method and system for reducing delays due to digital data processing requests to a function specific hardware circuit. A first embodiment of the present invention includes a first hardware stage implemented to perform the given function and a second parallel software stage implemented to perform the same function. The hardware stage employs circuitry to implement the function whereas the software stage performs the function using software instructions for instructing the processor to perform the function. This embodiment also includes an arbitration stage that routes data to either of the hardware or software stages depending on the availability of the hardware stage and in accordance with pre-defined arbitration rules. In a second embodiment of the present invention, multiple parallel software stages—each performing the same given function—can be employed with either a single hardware stage or multiple hardware stages and an arbitration stage.

Each of the above embodiments of the present invention function in accordance with a set of pre-defined arbitration rules. One set of pre-defined arbitration rules dictates that when the hardware stage is available, the current data request is always coupled to it and when the hardware stage is busy, the current data request is provided to the software stage.

Another set of pre-defined rules dictates that when the hardware stage is available, the current request is always coupled to it and when the hardware stage is busy, the arbitration stage checks accumulated availability state history for the hardware stage to determine whether to wait until the hardware stage is available or to provide the current request to the software stage.

The system and method of the present invention can be generalized to apply to any data processing system in which a function can be implemented in both hardware and software and in which multiple data requests may cause system delays. In one preferred embodiment of the present invention, the hardware and software stages of the system perform color matching and interpolation functions on color data provided by a color imaging system. In another embodiment of the present invention, data compression may be performed on the data by the hardware and software stages. And in still another embodiment, a data decompression function is performed.

DETAILED DESCRIPTION

The present invention provides a method and system for minimizing delays caused by digital data processing requests to a function specific hardware circuit. In the following description, numerous specific details are set forth, such as function types and arbitration rules, in order to provide a thorough understanding of the present invention. It will be obvious, however, to one skilled in the art that these specific details need not be employed to practice the present invention. In other instances, well-known computer system architectures and digital signal processing techniques have not been described in detail in order to avoid unnecessarily obscuring the present invention.

Figure 1:
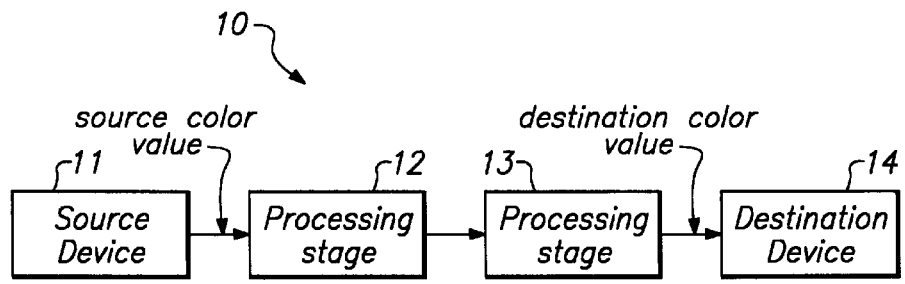
FIG. 1 shows a typical digital data color processing system.

The present invention is particularly useful in a data processing system that processes streams of digital values. FIG. 1 illustrates an example of a color processing system 10 that processes digital color values originating from a source device 11 (e.g., a monitor). The color values may be processed through a series of processing stages (12 and 13) in order to render a desirable color value when viewed on a destination device 14 (e.g. a printer). Each stage of the color processing system typically performs a specific function on each color value. For instance, one stage may be employed to convert a color value from a source color space to a destination color space, another stage may perform color interpolation, and still another stage may perform some data compression function.

Presently, the trend in system design is to implement stages 12 and 13 with function specific hardware circuitry (sometimes referred to as an accelerator circuit) instead of employing a general purpose processor running software. A hardware circuit tends to be quicker than software running on a processor since it is implemented to perform a single function and its associated delay is dependent on the individual integrated device delays within the circuit. Software stage delays, on the other hand, are dependent on processor instruction delays. Typically, it takes many instructions to implement a single function. Consequently, a processor running software is almost always slower than a comparable function specific hardware stage.

Figure 2:
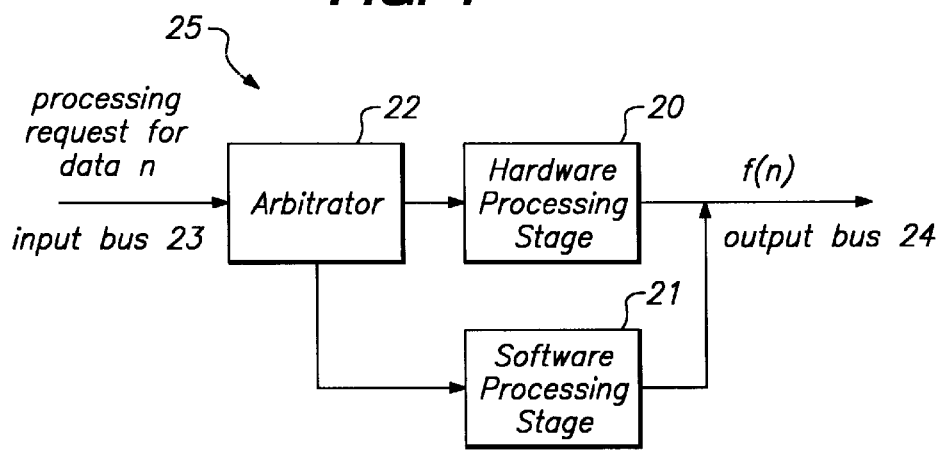
FIG. 2 shows a first embodiment of the present invention having a single hardware processor stage and a single software processor stage according to the method and system of the present invention.

In a system that uses a function specific hardware stage to process a stream of digital data values such as the color processing system described above, system bottlenecks may occur when requests begin to queue up at the input of the hardware stage. The system and the method of the present invention reduces this bottleneck by routing queued processing requests to a parallel software processing stage. FIG. 2 shows the processing system 25 of the present invention having a hardware processing stage 20, a software processing stage 21, and arbitrator stage 22. Hardware processing stage 20 is implemented with circuitry that performs the function n=f(n), where n is a digital value. Similarly, software processing stage 21 is capable of performing the same function. Software processing stage 21 is embodied as software code including instructions that control a processor to perform certain operations on the data value. The code is typically stored in a digital memory storage area. Arbitrator stage 22 accepts processing requests for data n on bus 23 and determines whether the request is to be processed by hardware stage 20 or software processing stage 21.

The data requests to system 25 may be in the form of blocks of data or single data value requests. In the case in which a data request is in block form, stages 20 or 21 are in an unavailable state until processing of all of the data within the block is complete.

In one embodiment of the present invention, after either of stages 20 or 21 processes the data n, a data f(n) is coupled to output bus 24. Bus 24 may be coupled to subsequent stages depending on the form of the data on output bus 24 and what it is to be used for. For instance, if bus 24 provides data to be used to drive a display device, bus 24 might be coupled directly to a display device engine. Alternatively, if the data on bus 24 is to be further processed, bus 24 might be coupled to subsequent processing stages.

The processing system 25 as shown in FIG. 2 may be employed as either of processing stages 12 and 13 in FIG. 1. Hence, system 25 of the present invention may be used as an improved processing stage to other prior art processing stages. Processing system 25 may be located within either of the source device 11 or destination device 14. Alternatively, processing system 25 of the present invention may be implemented as a discrete device.

Further, it should be noted that although the elements within system 25 are shown as a single unit, each of the elements need not be located within the same device, such as a source device or a destination device. For instance, arbitrator stage 22 may be located within the source device shown in FIG. 1 whereas stages 20 and 21 may be located within a destination device.

In the simplest embodiment of the present invention, arbitrator 22 functions as a switch responsive to the availability state of hardware stage 20. Hardware processing stages 20 and 21 inform arbitrator 22 of their availability state in a manner that is well known in the field of digital circuit design. Hardware processing stage 20 either may be busy processing data (i.e. busy state) or may be available. In response to an available state, arbitrator 22 passes data to stage 20. In response to a busy state, arbitrator 22 passes data to software processing stage 21.

Figure 3:
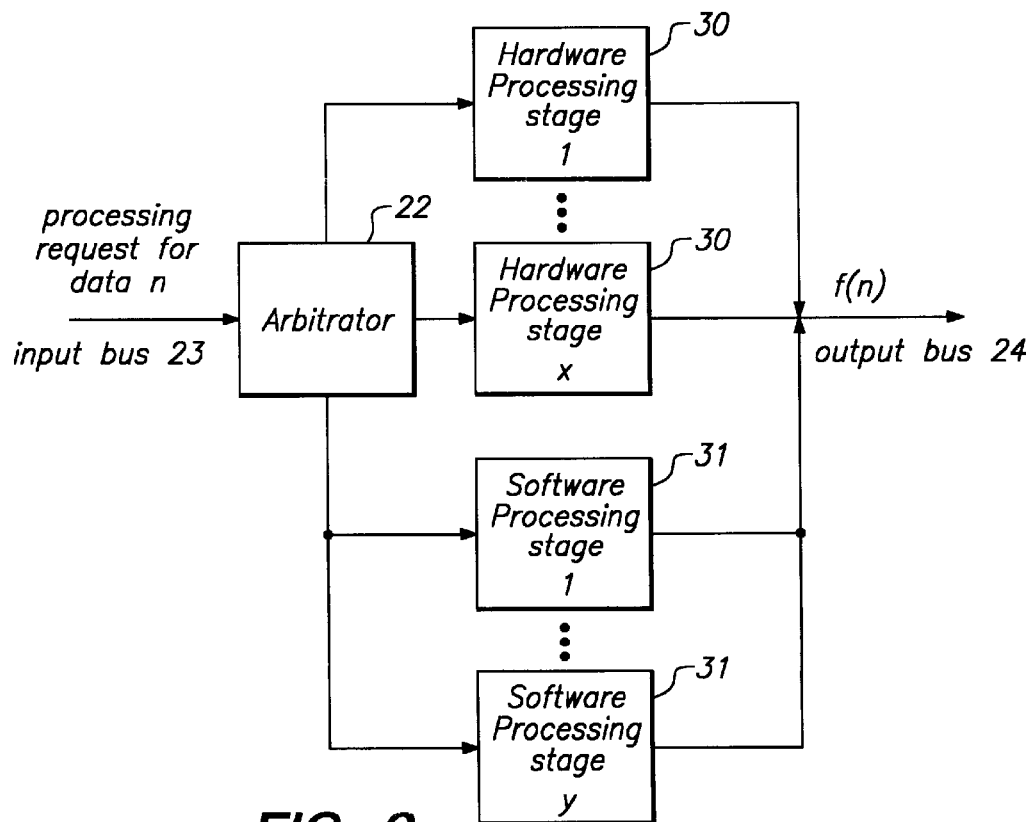
FIG. 3 illustrates a first method according to the system of the present invention.

FIG. 3 illustrates the method of the present invention corresponding to an arbitrator 22 that functions as described above. Specifically in one embodiment, when a data processing request occurs, arbitrator 22 determines if the hardware processing stage is available, (block 40, FIG. 3). If it is available, the data request is coupled to the hardware stage (block 41). If the hardware stage is unavailable, the data request is coupled to the software stage (block 42).

Figure 5:
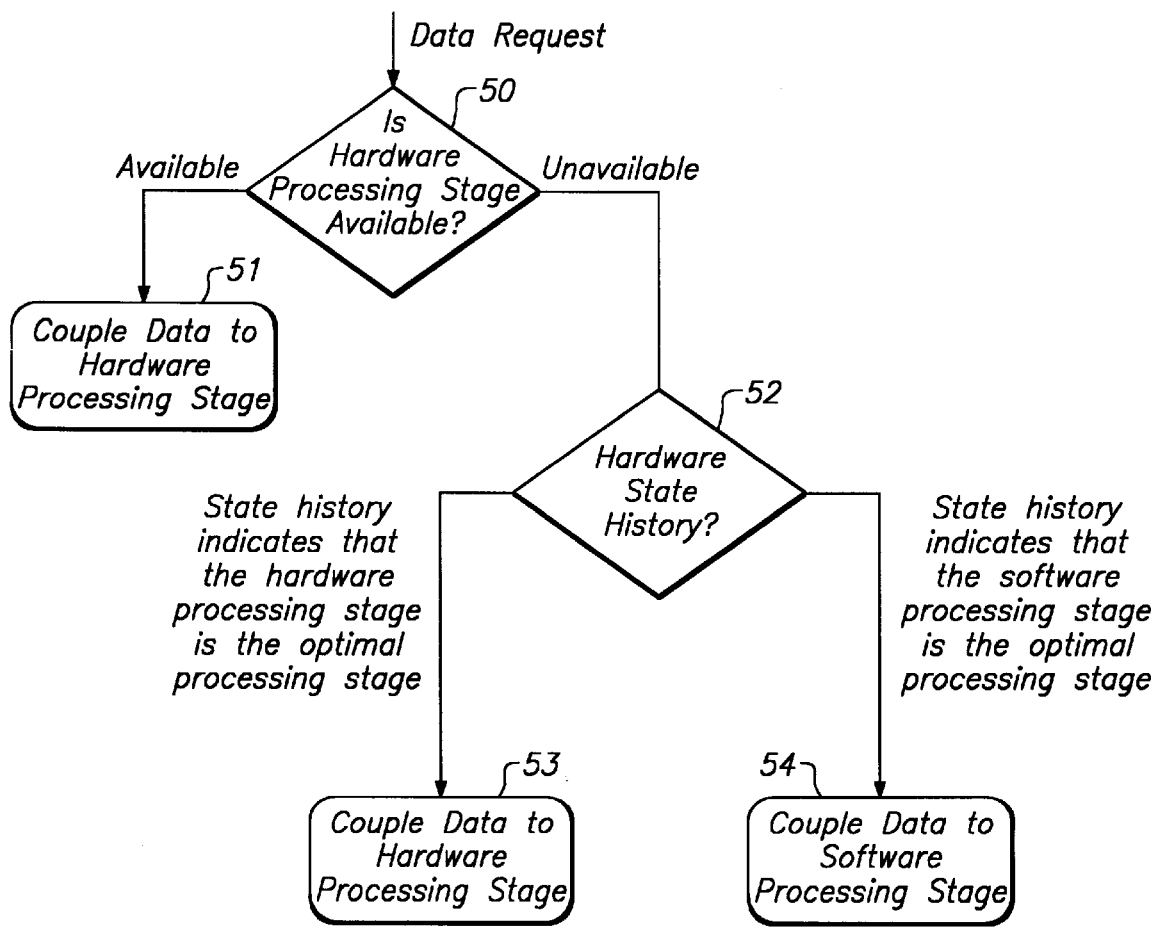
FIG. 5 shows a second embodiment of the present invention having multiple hardware processing stages and multiple software processing stages according to the method and system of the present invention.

In another embodiment of the present invention, arbitrator 22 evaluates the current state of hardware processing stage 20 along with accumulated hardware stage availability state history to determine whether to couple the current data request to stage 20 or 21. FIG. 5 illustrates the method corresponding to this embodiment. In this embodiment, when hardware processing stage 20 is available, data is always routed to it. However when hardware processing stage 20 is busy, arbitrator 20 evaluates the acquired history and current state of stage 20 to make a decision as to whether it would be faster to wait for hardware processing stage 20 to become free or if it would be faster to route data to software processing stage 21. State history may be stored within the arbitrator, within a memory storage area located within system 25, or within other system storage areas.

Figure 4:
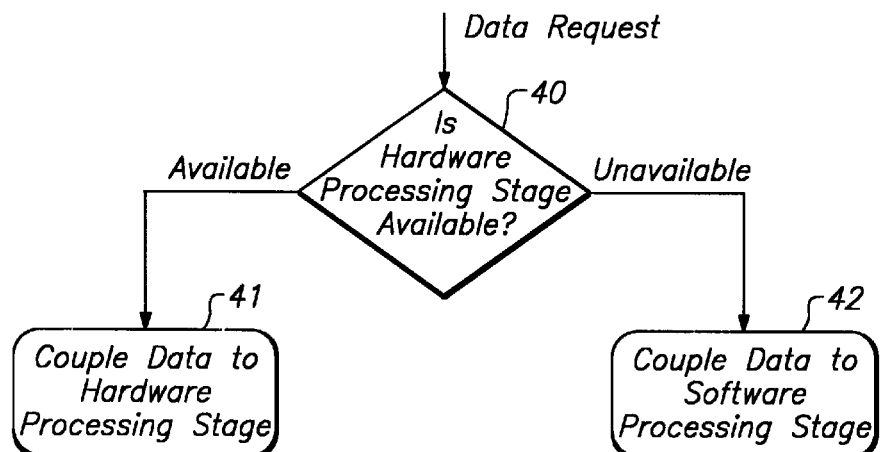
FIG. 4 illustrates a second method according to the system of the present invention.

As shown in FIG. 4 when a data request occurs the arbitrator determines if the hardware stage is available (block 50). If the hardware stage is available, the data request is coupled to the hardware stage (block 51). If the hardware stage is unavailable, the arbitrator evaluates the hardware state history (block 52). According to predetermined arbitration rules, if the state history indicates that the hardware stage is the optimal processing path, then the data request is coupled to the hardware stage (block 53). If the state history indicates that the software stage is the optimal processing path, then the data request is coupled to the software stage (block 54).

Acquired history information in its simplest form may include information such as the amount of time it previously took the hardware processing stage to become available. Or, acquired history may include information such as the average amount of time it has taken the hardware stage to become available. It should, however, be understood that other past and current information may be used by the arbitrator when making the decision as to where current data is to be coupled.

In the preferred embodiment of the present invention, hardware stage 20 is designed to perform a color interpolation/matching function on digital color values provided by a given source device. Data from the source device in this implementation are color values commonly representing graphic objects. Each color value or block of color values is matched to a destination device's color space. As part of this matching process, a color value or values from the source device may be interpolated within the color space of the destination device. This processing is carried out by function specific hardware processing stage 20 when it is available or by software processing stage 21 when the hardware stage is busy processing current color data. One sample of a suitable processing stage that can be employed in the implementation of the invention for the color value interpolation is disclosed in copending application Ser. No. 08/487,967, filed Jun. 6, 1995 now U.S. Pat. No. 5,678,033, the disclosure of which is incorporated herein by reference. The matched color data from the processing stage is then coupled to output bus 24. In another embodiment of the present invention, the hardware and software processing stages perform data compression on digital data.

FIG. 5 illustrates another embodiment of the present invention where one or more software processing stages is used in conjunction with one or more function specific hardware processing stages. FIG. 5 shows 1-to-X hardware stages 30 with 1-to-Y software processing stages. In this embodiment, queued requests are routed to one of the multiple hardware and software processing stages depending on the availability states of the hardware processing stages. As with the previous embodiment, arbitrator 22 couples data to the input of a hardware processing stage 30 in the case in which one of stages 30 is available. In the case in which all of hardware stages 30 are busy, data is routed to one of the available software processing stages 31 depending on the manner in which arbitrator 22 is implemented. Having multiple software and hardware processing stages reduces the chances of overall long service latency for a processing system including both hardware and software processing stages.

It should be noted that in comparison to prior art parallel processing techniques in which the parallel processing is perform strictly by parallel software stages, the present invention is able to process a single request through its hardware stage in a non-busy state faster than the prior art system is able to processes a single request through its parallel software stage in a non-busy state. Hence, the present invention takes advantage of the speed offered by the function specific hardware.

Although the elements of the present invention have been described in conjunction with certain embodiments, it is appreciated that the invention can be implemented in a variety of other ways. Consequently, it is to be understood that the particular embodiments shown and described by way of illustration are in no way intended to be considered limiting. Reference to the details of these embodiments is not intended to limit the scope of the claims which themselves recite only those features regarded as essential to the invention.

We claim:

1. In a system having a processor responsive to processor instructions, said system employing an electrical circuit to preform a specific function on a stream of digital data, a method for reducing delays on the input of said circuit comprising the steps of:

providing software code for causing said processor to execute said specific function;

determining whether said circuit is in either of a first available state and a second unavailable state;

providing current data from said stream of data to either of said circuit and said software code depending on said first and second state of said circuit;

wherein said system accumulates previous first and second state information and wherein when said circuit is in said second unavailable state said current data is provided to either of said circuit and said software code depending on said previous first and second information.

2. The method as described in claim 1 wherein said system is a computer.

3. The method as described in claim 1 wherein said system is a printer.

4. The method as described in claim 1 wherein said function performs data compression.

5. The method as described in claim 1 wherein said function is color data matching.

6. The method as described in claim 1 wherein said function is data decompression.

* * * * *